United States Patent
Purdy et al.

(10) Patent No.: US 11,912,936 B2
(45) Date of Patent: Feb. 27, 2024

(54) AQUEOUS MODIFIED ACID COMPOSITIONS AND METHODS OF USING THE SAME

(71) Applicant: FLUID ENERGY GROUP LTD., Calgary (CA)

(72) Inventors: Clay Purdy, Medicine Hat (CA); Markus Weissenberger, Calgary (CA); Cora Gordos, Calgary (CA)

(73) Assignee: Dorf Ketal Chemicals FZE

( * ) Notice: Subject to any disclaimer, the term of this patent is extended or adjusted under 35 U.S.C. 154(b) by 50 days.

(21) Appl. No.: 17/126,729

(22) Filed: Dec. 18, 2020

(65) Prior Publication Data

US 2021/0189226 A1  Jun. 24, 2021

(30) Foreign Application Priority Data

Dec. 20, 2019 (CA) .................................. CA 3065704

(51) Int. Cl.
*C09K 8/74* (2006.01)
*E21B 43/26* (2006.01)
*C09K 8/528* (2006.01)

(52) U.S. Cl.
CPC .............. *C09K 8/74* (2013.01); *C09K 8/528* (2013.01); *E21B 43/26* (2013.01); *C09K 2208/32* (2013.01)

(58) Field of Classification Search
CPC ....... C09K 8/74; C09K 8/528; C09K 2208/32
See application file for complete search history.

(56) References Cited

U.S. PATENT DOCUMENTS

| | | | |
|---|---|---|---|
| 9,676,706 B2* | 6/2017 | Recio, III | E21B 43/04 |
| 10,344,564 B2* | 7/2019 | Beuterbaugh | C09K 8/528 |
| 2004/0115288 A1* | 6/2004 | Sadeghi | A23L 33/105 |
| | | | 47/58.1 R |
| 2008/0078546 A1* | 4/2008 | Welton | C09K 8/06 |
| | | | 166/305.1 |
| 2011/0124533 A1* | 5/2011 | Notte | C02F 5/14 |
| | | | 507/235 |
| 2014/0041690 A1 | 2/2014 | MacDonald, II et al. | |
| 2014/0194335 A1* | 7/2014 | Gu | C02F 1/50 |
| | | | 510/273 |
| 2014/0296113 A1* | 10/2014 | Reyes | C09K 8/528 |
| | | | 507/241 |
| 2014/0374107 A1* | 12/2014 | Reyes | C09K 8/72 |
| | | | 166/305.1 |
| 2015/0114647 A1* | 4/2015 | Jiang | E21B 43/26 |
| | | | 166/305.1 |
| 2019/0144741 A1* | 5/2019 | Purdy | C09K 8/665 |
| | | | 507/270 |
| 2019/0345376 A1* | 11/2019 | Purdy | E21B 21/00 |

FOREIGN PATENT DOCUMENTS

| | | | | |
|---|---|---|---|---|
| CA | 2865855 A1 | 4/2015 | | |
| CA | 2974757 C | 10/2019 | | |
| DE | 4225620 A1 * | 2/1994 | | C08G 69/00 |

* cited by examiner

*Primary Examiner* — Silvana C Runyan
(74) *Attorney, Agent, or Firm* — Blank Rome LLP (57) ABSTRACT

An aqueous modified or synthetic acid composition comprising: an acid; a first component comprising: an amine and a carboxylic acid group; a second component comprising: an amine and a sulfonic acid group; wherein said first component and said acid are present in a molar ratio ranging from 1:3 to 1:15, more preferably from 1:3 to 1:12.5. Said acid composition is preferably used in acidizing or stimulating dolomite formations. Disclosed also are methods involving the use of said acid composition.

20 Claims, 6 Drawing Sheets

AQUEOUS MODIFIED ACID COMPOSITIONS AND METHODS OF USING THE SAME

CROSS REFERENCE TO RELATED APPLICATION

This application claims the benefit of Canada Application No. 3,065,704 filed Dec. 20, 2019, the entire contents of which are incorporated by reference herein.

FIELD OF THE INVENTION

This invention relates to compositions for use in the oil & gas industry, more specifically to aqueous modified acid compositions used in operations in dolomite formations.

BACKGROUND OF THE INVENTION

In the oil & gas industry, stimulation with an acid is performed on a well to initiate, increase or restore production. In some instances, a well initially exhibits low permeability, and stimulation is employed to commence production from the reservoir. In other instances, stimulation or remediation is used to further encourage permeability and flow from an already existing well that has become underproductive due to scaling issues or formation depletion.

Acidizing is a type of stimulation treatment which is performed above or below the reservoir fracture pressure in an effort to initiate, restore or increase the natural permeability of the reservoir. Acidizing is achieved by pumping acid, predominantly hydrochloric acid, into the well to dissolve typically limestone, dolomite and calcite cement between the acid insoluble sediment grains of the reservoir rocks or to treat scale accumulation.

There are three major types of acid applications: matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the fracture gradient. In this form of acidization, the acids dissolve the sediments formation and/or mud solids that are inhibiting the permeability of the rock, enlarging the natural pores of the reservoir (wormholing) and stimulating the flow of hydrocarbons to the wellbore for recovery. While matrix acidizing is done at a low enough pressure to keep from fracturing the reservoir rock, fracture acidizing involves pumping acid into the well at a very high pressure, physically fracturing the reservoir rock and etching the permeability inhibitive sediments. This type of acid treatment forms channels or fractures through which the hydrocarbons can flow, in addition to forming a series of wormholes or etches. In some instances, a proppant is introduced into the fluid which assists in propping open the fractures, further enhancing the flow of hydrocarbons into the wellbore.

There are many different mineral and organic acids used to perform an acid treatment on wells. The most common type of acid employed on wells to stimulate production is hydrochloric acid (HCl), which is useful in stimulating carbonate reservoirs.

Some of the major challenges faced in the oil & gas industry from using hydrochloric acid include the following: extremely high levels of corrosion (which is countered by the addition of 'filming' type corrosion inhibitors that are typically themselves toxic and harmful to humans, the environment and equipment) reactions between acids and various types of metals can vary greatly but softer metals, such as aluminum and magnesium, are very susceptible to major effects causing immediate damage. Hydrochloric acid produces hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes. HCl is widely available in industry and it is highly advantageous to modify this chemical to minimize the negative effects and optimize the positive effects of the HCl vs replacing it all together with another type of acid thereby greatly reducing the costs associated with alternative chemistry options such as organic acids or chelating agents or blends of such.

The inherent environmental effects (organic sterility, poisoning of wildlife etc.) of most acids in the event of an unintended or accidental release on surface or downhole into water aquifers or other sources of water are devastating and can substantially increase the toxicity and could potentially cause a mass culling of aquatic species and potential poisoning of humans or livestock and wildlife exposed to/or drinking the water. An unintended release at surface can also cause hydrogen chloride gas to be released, potentially endangering human and animal health. This is a common event at large storage sites when tanks split or leak. Typically, if near the public, large areas need to be evacuated post event and a comprehensive, expensive to implement, emergency evacuation plan needs to be in place prior to approval of such storage areas. Because of its acidic nature, hydrogen chloride gas is also corrosive, particularly in the presence of moisture.

The inability for mineral acids with common corrosion control additives and blends of such to biodegrade naturally results in expensive cleanup-reclamation costs for the operator should an unintended release occur. Moreover, the toxic fumes produced by mineral & some organic acids are harmful to humans/animals and are highly corrosive to skin, metals and other materials and/or produce potentially explosive vapours. Transportation and storage requirements for most acids, in particular HCl, are restrictive and taxing. As well, the dangers surrounding exposure by personnel handling the blending of such dangerous products constrict their use/implementation in areas of high risk such as within city limits and environmentally sensitive areas such as offshore Another concern is the potential for exposure incidents on locations due to high corrosion levels, even at ambient temperatures, of acids causing potential storage tank failures and/or deployment equipment failures i.e. coiled tubing or high-pressure iron failures caused by high corrosion high rates (pitting, cracks, pinholes and major failures). Other concerns include: downhole equipment failures from corrosion causing the operator to have to execute a work-over and replace down hole pumps, tubulars, cables, packers etc.; inconsistent strength or quality level of mineral & organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a finished product locally or very near its end use; transportation and onsite storage difficulties.

Typically, acids are produced in industrial areas of countries located some distance from oil & gas producing areas, up to 10 additives can also be required to control various aspects of the acids properties adding to complications in the handling and shipping logistics. Having an alternative that requires minimal additives is very advantageous.

Extremely high corrosion and reaction rates with temperature increase causes conventional acids to spend/react or "neutralize" prior to achieving the desired effect such as deeply penetrating an oil or gas formations to increase the wormhole or etched "pathway" effectively to allow the petroleum product to flow freely to the wellbore. As another example, hydrochloric acid can also be utilized in an attempt to free stuck drill pipe in some situations. Prior to getting to the required depth to dissolve the formation that has caused the pipe/tubing to become stuck many acids spend or neutralize on formation closer to the surface due to increased bottom hole temperatures and greatly increased reaction rate, so it is advantageous to have an alternative that spends or reacts more methodically allowing the slough to be treated with a solution that is still active, allowing the pipe/tubing to be pulled free.

When used to treat scaling issues on surface equipment due to water mineral precipitation, conventional acids are exposed to human and mechanical devices as well as expensive equipment causing increased risk and cost for the operator. When mixed with bases or higher pH fluids, acids will create a large amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with sea or produced water thereby increasing costs associated with transportation.

Conventional mineral acids used in a pH control situation can cause rapid degradation of certain polymers/additives requiring increased loadings or chemicals to be added to counter these negative effects, and/or many have stability issues and must be consumed or deployed within hours of blending making them very difficult to work with and produce large quantities of waste in some cases where they could not be deployed effectively or in time. Many offshore areas of operations, such as the North Sea, have very strict regulatory rules regarding the transportation/handling and deployment of acids causing increased liability and costs for the operator. When using an acid to pickle tubing or pipe, very careful attention must be paid to the process due to high levels of corrosion as well as the tendency of the spent HCl to reprecipitate solubilized iron as the pH level increases. Also, as temperatures increase, the typical additives used to control corrosion levels in acid systems begin to degrade very quickly (due to the inhibitors "plating out" on the steel or sheering out in high pumping rate applications) causing the acids to become very corrosive and resulting in damage to downhole equipment/tubulars. Conventional acids can be harmful to many elastomers and/or seals found in the oil & gas industry such as those found in blow out preventers (BOP's)/downhole tools/packers/submersible pumps/seals etc. Having to deal with spent acid during the backflush process is also very expensive as these acids typically are still at a low pH and remain toxic and corrosive. It is advantageous to have an acid blend that the spent acid or effluent can be exported to production facilities through pipelines that, once spent or applied, is much higher than that of spent HCl, reducing disposal costs/fees. Also, mineral acids will typically precipitate iron and/or minerals solubilized during the operation as the pH of the spent acid increases causing facility upsets and lost production. It is advantageous to have a strong acid that will hold these solubilized minerals and metals in solution even as pH rises dramatically close to a neutral state, greatly reducing the need to dispose of spent acids and allowing them to be processed and treated in a more economical manner. In many cases due to the design or process materials at treating facilities acid is required to be left down-hole and the pH allowed to increase to a level near or above 3.0 so as not to cause compatibility issues with metals at facilities such as duplex or super-duplex so it is very advantageous to have an acid system that typically has a spent pH of >3.0 vs the typical spent pH of 28% HCl that is ~1.0 or a spent 15% HCl that is ~1.5-1.8. If spent HCl is required to be left in the wellbore for an extended period of time there is a major risk of formation damage due to precipitation of solubilized metals and minerals.

Acids are used in the performance of many operations in the oil & gas industry and are considered necessary to achieve the desired production of various petroleum wells and down hole or surface associated equipment, maintain their respective systems and aid in certain drilling operational functions (i.e. freeing stuck pipe, filter cake treatments). The associated dangers that come with using mineral acids are expansive and tasking to mitigate through controls whether they are chemically or mechanically engineered.

Eliminating or greatly minimizing the negative effects of strong acids while maintaining their usefulness is a struggle and risk for the industry. As the public and government demand for the use of less hazardous chemicals increases, companies are looking for alternatives that perform the required function without all or most of the drawbacks associated with the use of conventional acids.

Several operations in the oil & gas industry expose acids and fluids to very high temperatures (some up to and over 200° C./392° F.), the compositions used in these various operations need to withstand high temperatures without losing their overall effectiveness. These compositions must also be capable of being applied in operations over a wide range of temperatures while not or at least minimally affecting or corroding the equipment with which it comes in contact in comparison to a conventional mineral acid of which the corrosion effect at ultra-high temperatures is very difficult and expensive to control.

Offshore oil and gas operations are highly regulated due to the environmental concerns which arise from their operations and the potential for spills along with confined work spaces offering little chance of egress in the case of an incident. The complexity of drilling and completing offshore wells is always compounded by both safety issues (exposure to dangerous chemicals as an example) for workers on such offshore oil rigs and production platforms as well as environmental concerns.

Many countries bordering the waters where offshore drilling and production is routinely carried out have put into play a number of regulations and operational parameters aimed at minimizing the environmental and human exposure impact. These regulations/procedures include the ban and/or regulation of certain chemicals which may be harmful to marine life and/or the environment. In order to overcome these very restrictive regulations, many oil companies employ very costly containment programs for the handling of certain chemicals, such as acids, which have a wide array of uses in the industry of oil and gas exploration and production.

Many of the issues related with offshore oil and gas exploration and production stem from the fact that the conditions under which this is carried out are substantially different than those encountered in the same types of operations carried out onshore, including but not limited to confined spaces, lack of escape routes, very expensive down hole and surface safety and operational equipment compared to onshore requirements Acids conventionally used in various oil and gas operations can be exposed to temperatures of up to 200° C. At these temperatures, their reactivity and corrosive properties is exponentially increased and as such their economical effectiveness is greatly decreased. Corrosion is one of the major concerns at high temperatures and is difficult and expensive to control with additional chemistry, if it can be controlled at all. In many situations, a mechanical procedure must be utilized as opposed to a chemical solution due to temperature constraints. In addition to the above factors many acid sensitive or high chrome metals are utilized in the construction of offshore platforms, wells and treating facilities such as Cr-13, duplex and super-duplex. Having an acid system that minimizes the negative effect on these metals is advantageous.

Modified and synthetic acids developed and currently patented such as those containing main components of urea and hydrochloric acid are aimed at increasing personnel safety, reducing corrosion effects, slowing down the reaction rate and reducing the toxicity of HCl. However, it has been found that at temperatures above 70° C. the urea component in a synthetic or modified acid containing such compound tends to ultimately decompose and produce ammonia and carbon dioxide as a by-product of decomposition. The ammonia component will neutralize the acidic component of the HCl and render the product non-reactive or neutral. Additionally, there is the risk of wellbore and/or formation damage due to uncontrolled solubilized mineral precipitation due to the increase in pH caused predominantly by the formation of ammonia during the decomposition phase.

CA patent application number CA 2,865,855 discloses compositions comprising hydrochloric acid at a concentration between 8 wt % and 28 wt % inclusive and at least one amino acid. The amino acid/hydrochloric acid molar ratio is between 0.2 and 1.5, and sufficient water is present to dissolve the hydrochloric acid and the amino acid. The amino acid may comprise alanine, asparagines, aspartic acid, cysteine, glutamic acid, histidine, leucine, lysine, methionine, proline, serine, threonine or valine or combinations thereof.

US patent application US 20140041690 A1 teaches the use of glycine in the making of a synthetic acid that is said to obviate all the drawbacks of strong acids such as hydrochloric acid. The new compound is made by dissolving glycine in water, in a weight ratio of approximately 1:1 to 1:1.5. The description states that the solution is mixed until the glycine is essentially fully dissolved in the water. Once dissolution is complete, hydrogen chloride gas is dissolved in the solution to produce the new compound, which is referred to as hydrogen glycine.

Canadian patent number CA 2,974,757, by the Applicant, discloses an aqueous synthetic acid composition for use in oil industry activities, said composition comprising: lysine and hydrogen chloride in a molar ratio ranging from 1:3 to 1:12.5, preferably from more than 1:5 to 1:8.5; it can also further comprise a metal iodide or iodate; an alcohol or derivative thereof. Said composition demonstrates advantageous properties over known synthetic acids at temperatures above 90° C. Said composition is useful in various oil and gas industry operations. Preferred embodiments of said composition providing substantial advantages in matrix acidizing by increasing the effectiveness of wormholing compared to conventional mineral acids such as HCl. The content of this patent is incorporated in its entirety.

The frequency of dolomite formations in oil and gas fields cause substantial difficulties to operators as, unlike limestone, dolomite does not readily react with dilute HCl. In fact, as dolomite is a sedimentary carbonate rock composed of calcium magnesium carbonate (having the formula $CaMg(CO_3)_2$), the magnesium seems to be the component that prevents the reaction with HCl. Back in the 1980's, it was estimated that 80% of North American oil and gas reserves where present in dolomite formations. As such formations are not exploited easily using HCl it is desirable to use a method or process which can extract hydrocarbons from dolomite formations.

Despite the prior art and in light of the substantial problems elicited by the use of acids in oil and gas operations on dolomite formations, there still exists a critical need to find an alternative to known synthetic or complexed/modified acids to provide better performance on hydrocarbon-bearing dolomite formations. The inventors have surprisingly and unexpectedly found that a component added to an acidic composition will help modify the dissolution performance of the acid in dolomite formations. This modification of the dissolution performance enables the creation of wormholes which is desirable for the extraction of hydrocarbons from the ground. These new compositions are more preferably used in matrix acidizing formation. Matrix acidizing is desirable as it overcomes the environmental restrictions placed on fracking in several communities. As fracking is avoided, the occurrence of man-made earthquakes related to fracking operations do not occur when performing matrix acidizing.

SUMMARY OF THE INVENTION

Compositions according to the present invention have been developed for the oil & gas industry and its associated applications, by targeting the difficulties encountered when dealing with effectively stimulating dolomite predominant formations.

The main difference between limestone formations and dolomite formations is the Limestone is a type of carbonate sedimentary rock. It is composed mostly of the minerals calcite and aragonite, which are different crystal forms of calcium carbonate ($CaCO_3$). A closely related rock is dolomite, which contains a high percentage of the mineral dolomite, $CaMg(CO_3)_2$. Dolomite is an anhydrous carbonate mineral composed of calcium magnesium carbonate, Additionally, according to a preferred embodiment of the present invention, the composition useful for application in dolomite formation also exhibits favorable corrosion profile, logistics & handling advantages, minimizing human & environmental dangers upon exposure, improving the: reaction rates of the acid composition; toxicity levels; biodegradation tendencies; formation/fluid compatibilities and facility and/or production and water treatment infrastructure compatibilities. Preferred embodiments of the present invention can also answer some of the hitherto unmet needs such as decreasing a number of the associated dangers and operational issues, such as high corrosion rates and wellbore damage caused by an explosive or extremely aggressive reaction rate at higher temperatures typically associated with conventional acids.

Accordingly, a composition according to a preferred embodiment of the present invention can overcome many of the drawbacks found in the use of compositions of the prior art especially when used on dolomite formations.

According to an aspect of the invention, there is provided an aqueous synthetic acid composition comprising:
  an acid;
    a first component comprising: an amine and a carboxylic acid group;
    a second component comprising: an amine and a sulfonic acid group;
    wherein said first component and said acid are present in a molar ratio ranging from 1:3 to 1:15, more preferably from 1:3 to 1:12.5.

Preferably, the acid is selected from the group consisting of: HCl; and amino acid:HCl acid blend. Preferably also, the first component is selected from the group consisting of: an amino acid; creatine; creatinine; zwitterionic compounds. Preferably, the amino acid-HCl acid blend is selected from the group consisting of: lysine-HCl; glycine-HCl; valine-HCl; tryptophan-HCl; alanine-HCl; methionine-HCl; histidine-HCl; arginine-HCl; serine-HCl; tyrosine-HCl; glutamine-HCl; asparagine-HCl; phenylalanine-HCl; proline-HCl; cysteine-HCl; leucine-HCl; isoleucine-HCl; aspartic acid-HCl; glutamic acid-HCl; threonine-HCl; and selenocysteine-HCl.

More preferably, the amino acid-HCl acid blend is selected from the group consisting of: lysine-HCl; glycine-HCl; alanine-HCl; methionine-HCl; histidine-HCl; arginine-HCl; serine-HCl; proline-HCl; cysteine-HCl; threonine-HCl; and selenocysteine-HCl.

According to a preferred embodiment of the present invention, the second component is selected from the group consisting of: taurine; taurolidine; taurocholic acid; tauroselcholic acid; tauromustine; 5-Taurinomethyluridine and 5-taurinomethyl-2-thiouridine; homotaurine (tramiprosate); acamprosate; and taurates. Preferably, the compound comprising an amine moiety and a sulfonic acid moiety is taurine.

According to a preferred embodiment of the present invention, the composition is stable at temperatures of up to at least 80° C.

According to another preferred embodiment of the present invention, the composition is stable at temperatures of up to at least 120° C.

According to yet another preferred embodiment of the present invention, the composition is stable at temperatures of up to at least 150° C.

Preferably, the composition has a pH of no more than 2, more preferably no more than 1.5. Even more preferably, the composition has a pH of less than 1.

According to a preferred embodiment of the present invention, the acid is present in an amount ranging from 5 to 40 wt % of the total composition.

According to another preferred embodiment of the present invention, the acid is present in an amount ranging from 10 to 30 wt % of the total composition.

According to yet another preferred embodiment of the present invention, the second component comprising: an amine and a sulfonic acid group is present in an amount ranging from 1 to 20 wt % of the total composition. Preferably, the second component comprising: an amine and a sulfonic acid group is present in an amount ranging from 2 to 15 wt % of the total composition. More preferably, the second component comprising: an amine and a sulfonic acid group is present in an amount ranging from 5 to 10 wt % of the total composition.

According to another aspect of the invention, there is provided a use of a composition for the dissolution of dolomite in a geological formation.

According to another aspect of the invention, there is provided a method to selectively dissolve dolomite over calcium carbonate rock, said method comprising the steps of:
  providing a rock formation containing dolomite;
  providing a composition comprising
    an acid;
    a first component comprising: an amine and a carboxylic acid group;
    a second component comprising: an amine and a sulfonic acid group;
    wherein said first component and said acid are present in a molar ratio ranging from 1:3 to 1:12.5;
  exposing the rock formation to said composition for a period of time sufficient to dissolve dolomite and create wormholes.

According to another aspect of the invention, there is provided a method of matrix acidizing a hydrocarbon-containing dolomite formation, said method comprising:
  providing a composition comprising:
    an acid;
    a first component comprising: an amine and a carboxylic acid group;
    a second component comprising: an amine and a sulfonic acid group;
    wherein said first component and said acid are present in a molar ratio ranging from 1:3 to 1:12.5;
  injecting said composition downhole into said formation at a pressure below the fracking pressure of the formation; and
  allowing a sufficient period of time for the composition to contact said formation to create wormholes in said formation.

According to a preferred embodiment of the present invention, the second component is comprised of two molecules, each one having either an amine group or a sulfonic acid group.

According to another aspect of the invention, there is provided a method of matrix acidizing a hydrocarbon-containing limestone formation, said method comprising:
  providing a composition comprising:
    an acid;
    a first component comprising: an amine and a carboxylic acid group;
    a second component comprising: an amine and a sulfonic acid group;
    wherein said first component and said acid are present in a molar ratio ranging from 1:3 to 1:12.5;
  injecting said composition downhole into said formation at a pressure below the fracking pressure of the formation; and
  allowing a sufficient period of time for the composition to contact said formation to create wormholes in said formation.

According to another aspect of the invention, there is provided a method of creating wormholes in a hydrocarbon-containing formation, said method comprising:
  providing a composition comprising:
    an acid;
    a first component comprising: an amine and a carboxylic acid group;
    a second component comprising: an amine and a sulfonic acid group;
    wherein said first component and said acid are present in a molar ratio ranging from 1:3 to 1:12.5;

injecting said composition downhole at a desired injection rate into said formation at a pressure below the fracking pressure of the formation; and allowing a sufficient period of time for the composition to contact said formation to create wormholes in said formation;

wherein said injection rate is below the injection rate used with a conventional mineral acid.

According to a preferred embodiment of the present invention, there is provided a method of matrix acidizing a hydrocarbon-containing dolomite formation, said method comprising:

providing a composition comprising:
an acid;
a first component comprising: an amine and a carboxylic acid group;
a second component comprising: an amine and a sulfonic acid group;
wherein said first component and said acid are present in a molar ratio ranging from 1:3 to 1:12.5;
injecting said composition downhole into said formation at a pressure below the fracking pressure of the formation; and
allowing a sufficient period of time for the composition to contact said formation to create wormholes in said formation.

According to a preferred embodiment of the present invention, there is provided a method of matrix acidizing a hydrocarbon-containing limestone formation, said method comprising:

providing a composition comprising:
an acid;
a first component comprising: an amine and a carboxylic acid group;
a second component comprising: an amine and a sulfonic acid group;
wherein said first component and said acid are present in a molar ratio ranging from 1:3 to 1:12.5;
injecting said composition downhole into said formation at a pressure below the fracking pressure of the formation; and
allowing a sufficient period of time for the composition to contact said formation to create wormholes in said formation.

According to a preferred embodiment of the present invention, there is provided a method of creating wormholes in a hydrocarbon-containing formation, said method comprising:

providing a composition comprising:
an acid;
a first component comprising: an amine and a carboxylic acid group;
a second component comprising: an amine and a sulfonic acid group;
wherein said first component and said acid are present in a molar ratio ranging from 1:3 to 1:12.5;
injecting said composition downhole at a desired injection rate into said formation at a pressure below the fracking pressure of the formation; and
allowing a sufficient period of time for the composition to contact said formation to create wormholes in said formation;
wherein said injection rate is below the injection rate used with a conventional mineral acid.

Preferably, the desired injection rate used is determined by testing said composition at various injection rates into a core sample of said formation; collecting the pore volume to breakthrough data obtained from said testing; plotting a graph of the pore volume to breakthrough data against the injection rate; and determining the optimal injection rate as the lowest point on the plot.

According to another aspect of the present invention, there is provided a use of an aqueous synthetic or modified acid composition in the oil industry to perform an activity selected from the group consisting of: stimulate formations; assist in reducing breakdown pressures during downhole pumping operations; treat wellbore filter cake post drilling operations; assist in freeing stuck pipe; descale pipelines and/or production wells; increase injectivity of injection wells; lower the pH of a fluid; remove undesirable scale on a surface selected from the group consisting of: equipment, wells and related equipment and facilities; fracture wells; complete matrix stimulations; conduct annular and bullhead squeezes & soaks; pickle tubing, pipe and/or coiled tubing; increase effective permeability of formations; reduce or remove wellbore damage; clean perforations; and solubilize limestone, dolomite, calcite and combinations thereof; said composition comprising lysine and HCl in a molar ratio ranging from 1:2.1 to 1:12.5. Preferably, the composition comprises lysine and HCl in a molar ratio ranging from 1:4.5 to 1:8.5.

BRIEF DESCRIPTION OF THE FIGURES

The invention may be more completely understood in consideration of the following description of various embodiments of the invention in connection with the accompanying figure, in which.

DETAILED DESCRIPTION OF THE PREFERRED EMBODIMENTS

The description that follows, and the embodiments described therein, is provided by way of illustration of an example, or examples, of particular embodiments of the principles of the present invention. These examples are provided for the purposes of explanation, and not limitation, of those principles and of the invention.

According to a preferred embodiment of the present invention, lysine-HCl is the main component in terms of volume and weight percent of the composition. Lysine, as an amino acid, contains at least one amino group, —NH 2, and one carboxyl group, —COOH. In the case of lysine, there are 2 amino groups. When added to hydrochloric acid a Lewis acid/base adduct is formed where the primary amino group acts as a Lewis base and the proton of the HCl as Lewis acid. The formed adduct greatly reduces the hazardous effects of the hydrochloric acid on its own, such as the fuming effect, the hygroscopicity, and the highly corrosive nature. The excess nitrogen can also act as a corrosion inhibitor at higher temperatures. Lysine & hydrogen chloride are present in a molar ratio ranging from 1:3 to 1:12.5; preferably in a molar ratio ranging from 1:4.5 to 1:9, and more preferably in a molar ratio ranging from more than 1:5 to 1:8.5. The lysine-HCl ratio can be adjusted or determined depending on the intended application and the desired solubilizing ability. By increasing the ratio of the HCl component, the solubilizing ability will increase while still providing certain health, safety, environmental and operational advantages over hydrochloric acid.

It is preferable to add the lysine at a molar ratio less than 1:1 to the moles of HCl acid (or any acid). Tests have shown than even adding lysine to HCl in a molar ratio of around 1:2 would neutralize the hydrochloric acid to the point of almost completely removing all of its acidic character. Preferably, the composition used in the present invention comprises at most 1 mole of lysine per 3.0 moles of HCl. The lysine-hydrochloride also allows for a reduced rate of reaction when in the presence of various formations. This again is due to the stronger molecular bonds associated over what hydrochloric acid traditionally displays. Further, since a lysine-HCl is mainly comprised of lysine (which is naturally biodegradable), the product testing has shown that the lysine-hydrochloride will maintain the same biodegradability function, something that hydrochloric acid will not on its own. For arginine and histidine the ratio is even higher because there are more amine groups; 4 in arginine and 3 in histidine.

When other amino acids are used, the ratios vary between the amino acid and the acid (such as HCl) will vary from the ratios in the preferred lysine-HCl compositions. Nevertheless, one will note that some activity (acidic character) must be kept, otherwise, the modified acid will no longer have the desired utility for the intended purposes.

Alcohols and derivatives thereof, such as alkyne alcohols and derivatives and preferably propargyl alcohol and derivatives thereof can be added to the modified acid as corrosion inhibitors. Propargyl alcohol itself is traditionally used as a corrosion inhibitor which works well at low concentrations. It is however a very toxic/flammable chemical to handle as a concentrate, so care must be taken when exposed to the concentrate. According to a preferred embodiment of the present invention, it is preferred to use 2-Propyn-1-ol, complexed with methyloxirane, as this is a much safer derivative to handle. Basocorr® PP is an example of such a compound. Metal iodides or iodates such as potassium iodide, sodium iodide, cuprous iodide and lithium iodide can also potentially be used as corrosion inhibitor intensifier. In fact, potassium iodide is a metal iodide traditionally used as corrosion inhibitor intensifier, however it is expensive, but works extremely well. It is non-regulated and safe to handle. The iodide or iodate is preferably present in a weight percentage ranging from 0.01 to 0.5 wt % (10% of a solution ranging from 0.1 to 5%), more preferably from 0.02 to 0.3 wt %, yet even more preferably from 0.025 to 0.2 wt %.

Example 1—Preparation of a Modified Acid for Use According to a Preferred Embodiment of the Present Invention Lysine mono-hydrochloride is used as starting reagent. To obtain a 1:2.1 molar ratio of lysine to HCl, 370 ml of a 50 wt % lysine-HCl (also referred to as L50) solution and 100 ml HCl aq. 36% (22 Baume) are combined. In the event that additives are used, they are added after thorough mixing. For example, propargyl alcohol, and potassium iodide can be added at this point. Circulation is maintained until all products have been solubilized. Additional components can now be added as required. The process to obtain other compositions according to the present invention is similar where the only difference lies in the amount of HCl added.

The resulting composition of Example 1 is an amber colored liquid with a fermentation like odour having shelf-life of greater than 1 year. It has a freezing point temperature of approximately minus 30° C. and a boiling point temperature of approximately 100° C. It has a specific gravity of 1.15±0.02. It is completely soluble in water and its pH is less than 1.

The composition is biodegradable and is classified as a mild irritant according to the classifications for skin tests. The composition is substantially low fuming. Toxicity testing was calculated using surrogate information and the LD50 was determined to be greater than 2000 mg/kg.

Example 2—Preparation of a Modified Acid for Use According to a Preferred Embodiment of the Present Invention A modified acid composition as used in a preferred composition of the present invention was prepared to yield a lysine:HCl composition in a ratio of 1:4.5. This composition is obtained through the following mixing ratio: 370 ml of L50 solution+300 ml 22Baume HCl; which leads to the following ratio: 1 mol Lysine monohydrochloride to 4.5 mol HCl.

The composition of Example 2 has an amber liquid appearance. Its salinity is 48%. Its freezing point is minus 45° C. and boiling point above 100° C. Its pH is below 1.0. The composition of Example 2 was also tested for skin corrosiveness and deemed non-corrosive to the skin. Oral toxicity was calculated using the LD50 rat model and deemed to be of low oral toxicity. It is considered readily biodegradable and offers a lower bioaccumulative potential when compared to 15% HCl.

The composition of Example 2 will be used either as is or diluted for the dissolution testing series discussed below.

Example 3—the Preparation of Taurine-Containing Modified Acid Compositions

The composition of Example #2 were then prepared with a small content of taurine. The process involves the addition of the desired amount of taurine in solid form to the composition of Example #2 while the latter is being mixed. The amount of taurine is determined as a weight % of the total weight of the composition.

Example 4—the Preparation of Another Modified Acid Composition

Monoethanolamine (MEA) and hydrochloric acid are used as starting reagents. To obtain a 4.1:1 molar ratio of MEA to HCl, one must first mix 165 g of MEA with 835 g of water. This forms the monoethanolamine solution. Subsequently, one takes 370 ml of the previously prepared monoethanolamine solution and mixes with 350 ml of HCl aq. 36% (22 Baume). In the event that additives are used, they are added after thorough mixing of the MEA solution and HCl.

Example 5—Preparation of a Modified Acid Using Histidine

A modified acid composition as used in a preferred composition of the present invention was prepared to yield a Histidine:HCl composition in a molar ratio of 1:5.125. This composition was obtained by using a similar approach which was used for Example 2.

Example 6—Preparation of a Modified Acid Using Arginine

A modified acid composition as used in a preferred composition of the present invention was prepared to yield a Arginine:HCl composition in a molar ratio of 1:5.125. This composition was obtained by using a similar approach which was used for Example 2.

Total Solubility and Reaction Rate of Various Acidic Compositions on Various Substrates (Calcium Carbonate, Dolomite and Limestone)

Testing was carried out on various substrates to assess the efficiency of a modified acid composition prior to its enhancement with a component comprising both an amine moiety and sulfonic moiety. Taurine was used as the component comprising both an amine moiety and sulfonic moiety compound in the below series of tests as it is easily available commercially.

Figure 1:
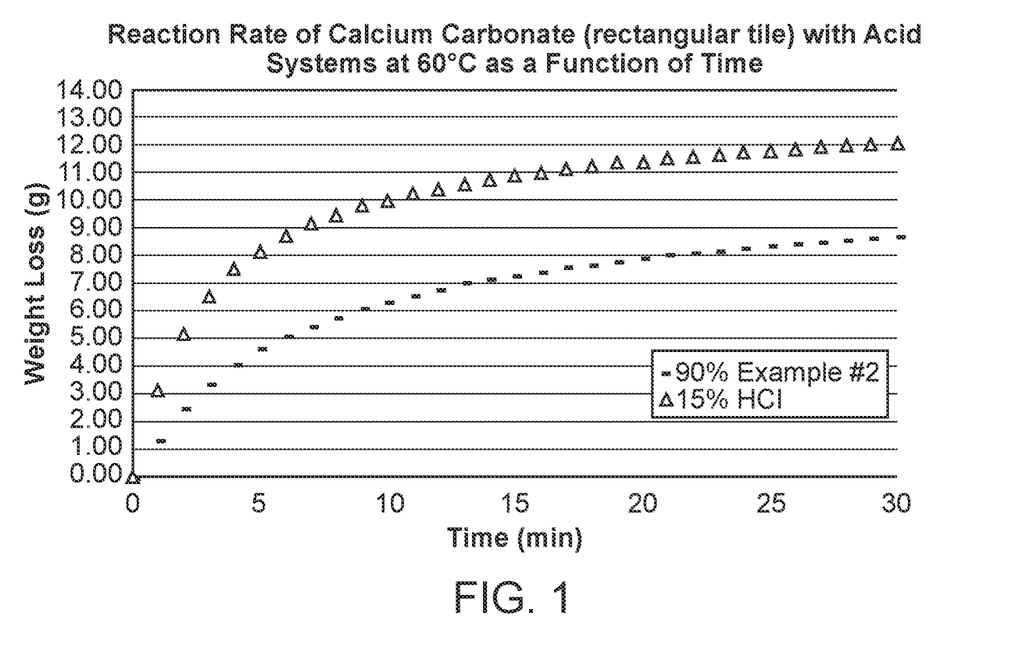
FIG. 1 is a graphical representation of the solubility of calcium carbonate (rectangular tile) in a Lysine-HCl hybrid acid system at 60° C.

Reaction rates were tested for a 90% composition of Example #2 (this was diluted with water to get a 15% $HCl_{(aq)}$ content), and 15% $HCl_{(aq)}$ at 60° C. on calcium carbonate, limestone and dolomite of various tiles. FIG. 1 shows the dissolution of calcium carbonate over time for the above two compositions. As expected, the $HCl_{(aq)}$ composition dissolved the calcium carbonate more quickly than the composition of Example #2. This is a clear indication that $HCl_{(aq)}$ would not perform as good quality wormholes as the composition of Example #2. Good wormholes are desirable for good extraction of hydrocarbons trapped in a calcium carbonate formation.

Figure 2:
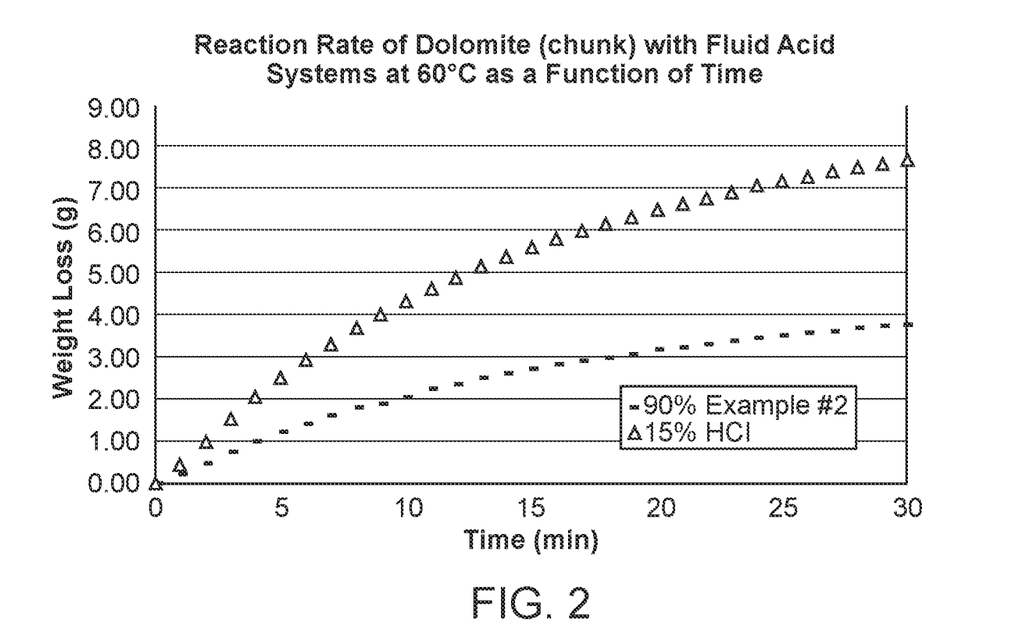
FIG. 2 is a graphical representation of the solubility of dolomite (hexagonal tile) in a Lysine-HCl hybrid acid system at 60° C.

FIG. 2 shows the dissolution of dolomite (tile) over time for the above two compositions. As expected, the HCl composition dissolved the dolomite more quickly than the composition of Example #2. This is a clear indication that HCl would not perform as good quality wormholes as the composition of Example #2.

Figure 3:
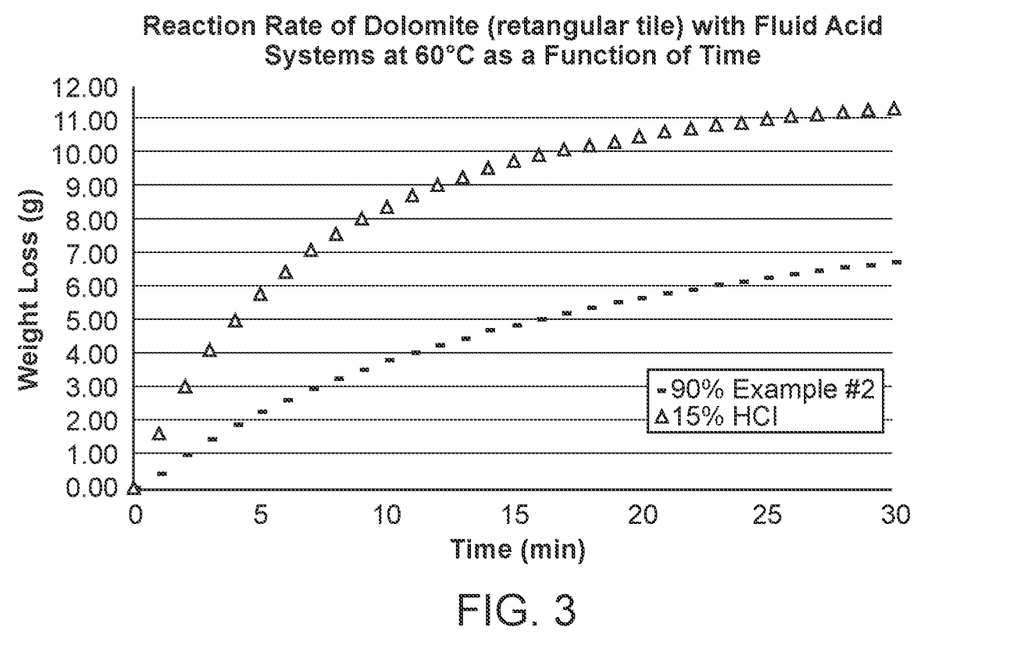
FIG. 3 is a graphical representation of the solubility of dolomite (hexagonal tile) in a Lysine-HCl hybrid acid system at 60° C.

FIG. 3 shows the dissolution of dolomite (hexagonal tile) over time for the above two compositions. As expected, the HCl composition dissolved the dolomite more quickly than the composition of Example #2. This is a clear indication that HCl would not perform as good quality wormholes as the composition of Example #2.

Figure 4:
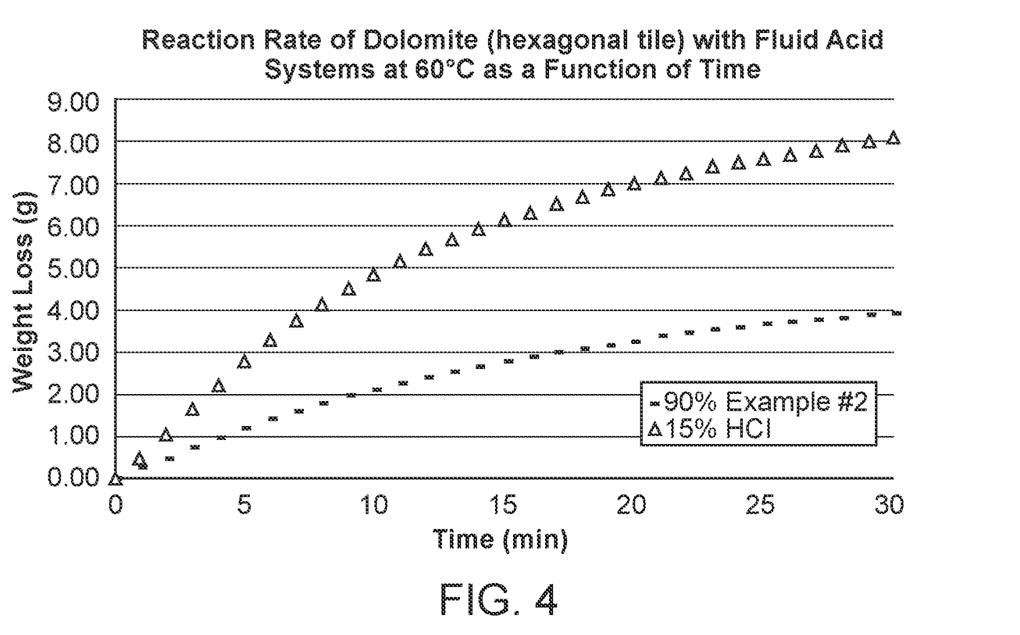
FIG. 4 is a graphical representation of the solubility of dolomite (hexagonal tile) in a Lysine-HCl hybrid acid systems at 60° C.

FIG. 4 shows the dissolution of dolomite (hexagonal tile) over time for the above two compositions. As expected, the HCl composition dissolved the dolomite more quickly than the composition of Example #2. This is a clear indication that HCl would not perform as good quality wormholes as the composition of Example #2.

Determining the Reaction Rates of Blend of Example #2—Taurine

The purpose was to determine the solubility of dolomite and limestone in hybrid blends of Example #2-Taurine (Example #3).

The procedure consisted of preparing blends of Example #2 with taurine at three different ratios; 90:10, 95:5, 97.5:2.5 and contrasted with a 90% solution of the composition of Example #2. On a two-decimal balance, a uniformed piece of either dolomite or limestone was added to the solution. As the solid solubilized, the weight loss was recorded at one-minute intervals for a total of 30 minutes.

Figure 5:
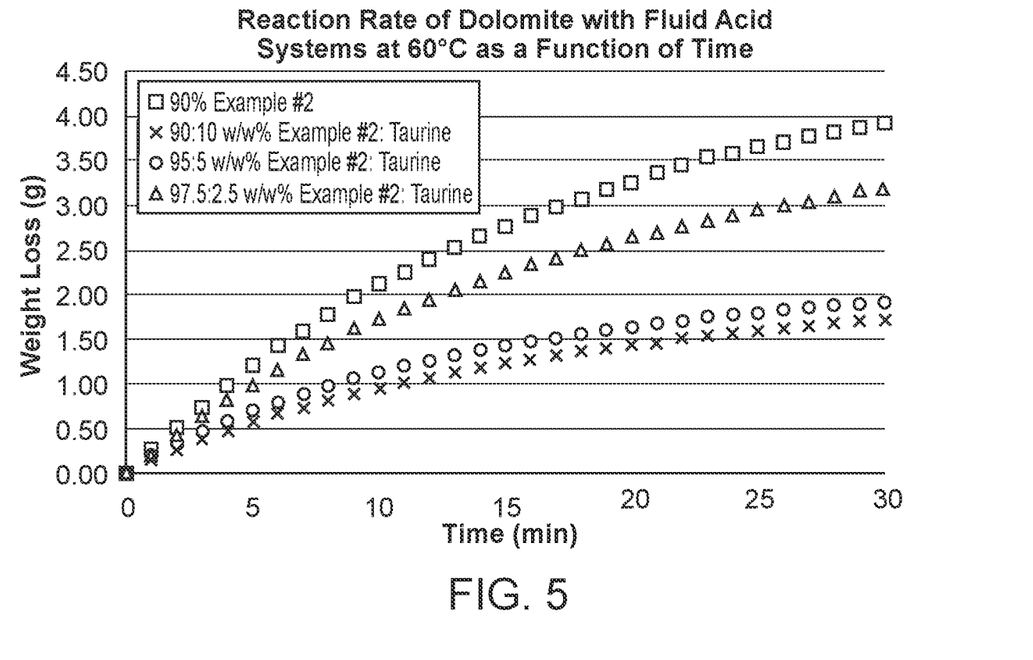
FIG. 5 is a graphical representation of the solubility of dolomite (hexagonal tile) in various Lysine-HCl-Taurine hybrid acid systems at 60° C.

FIG. 5 shows the dissolution of dolomite (hexagonal tile) over time for 4 different compositions. The first being the composition of Example #2, the second being a blend of the composition of Example #2 and (90% content) and 10% of taurine, the third being a blend of the composition of Example #2 (95% content) and 5% of taurine, and the fourth being a blend of the composition of Example #2 (97.5% content) and 2.5% of taurine. As expected, the Example #2 composition dissolved the dolomite more quickly than each one of the taurine-containing compositions. The best performance was noted to be the 5% and 10% taurine-containing compositions. This is a clear indication that the presence of taurine in an acidic composition has a quantifiable and desirable effect in making wormholes for good extraction of hydrocarbons trapped in a dolomite formation.

Figure 6:
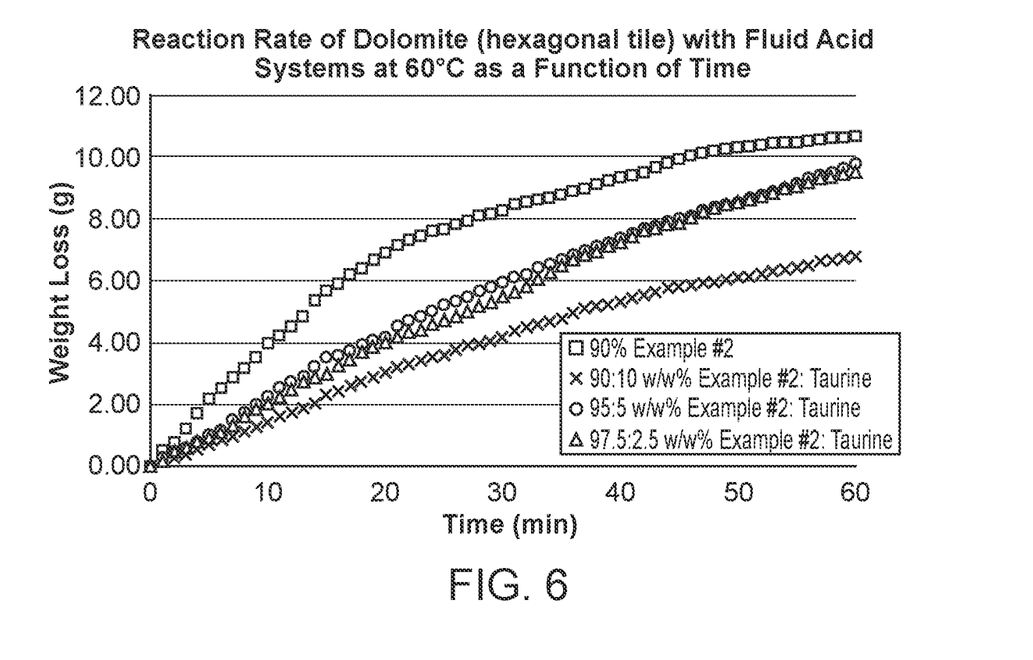
FIG. 6 is a graphical representation of the solubility of limestone (hexagonal tile) in various Lysine-HCl-Taurine hybrid acid systems at 60° C.

FIG. 6 shows the dissolution of dolomite (hexagonal tile) over time for 4 different compositions. The first being the composition of Example #2, the second being a blend of the composition of Example #2 and (90% content) and 10% of taurine, the third being a blend of the composition of Example #2 (95% content) and 5% of taurine, and the fourth being a blend of the composition of Example #2 (97.5% content) and 2.5% of taurine. As expected, the Example #2 composition dissolved the dolomite more quickly than all of the taurine-containing compositions. The best performance was noted to be the 10% taurine-containing composition. Again, this is further indication that the presence of taurine in an acidic composition has a quantifiable and desirable effect in making wormholes for good extraction of hydrocarbons trapped in a dolomite formation.

Figure 7:
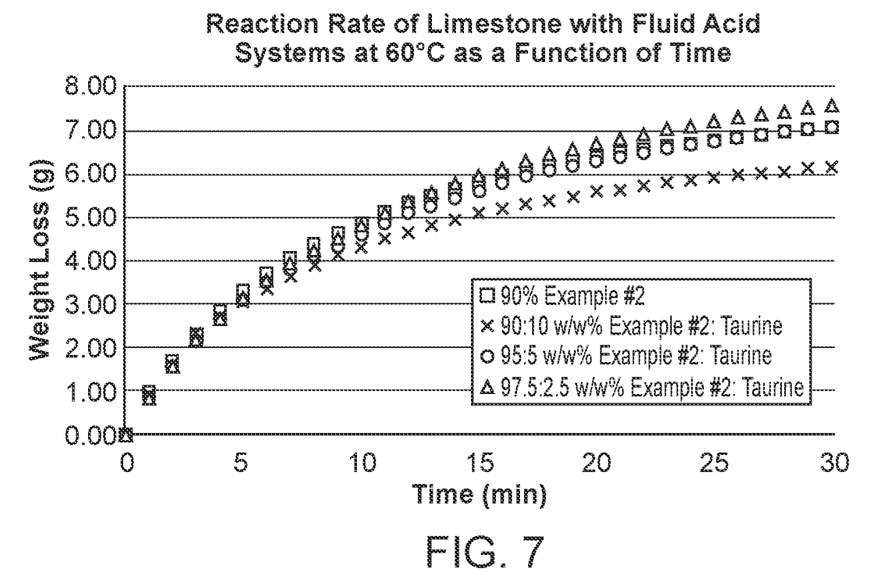
FIG. 7 is a graphical representation of the long-term solubility of limestone in various Lysine-HCl-Taurine hybrid acid systems at 60° C.

FIG. 7 shows the dissolution of limestone over time for 4 different compositions. The first being the composition of Example #2, the second being a blend of the composition of Example #2 and (90% content) and 10% of taurine, the third being a blend of the composition of Example #2 (95% content) and 5% of taurine, and the fourth being a blend of the composition of Example #2 (97.5% content) and 2.5% of taurine. As expected, the Example #2 composition dissolved the dolomite more quickly than all of the taurine-containing compositions. However, the performance of the taurine-containing compositions was not substantially different as it is when exposed to dolomite. Again, the best performance was noted to be by the 10% taurine-containing composition. This is an indication that the presence of taurine in an acidic composition has a quantifiable and desirable effect in making wormholes for good extraction of hydrocarbons trapped even in a limestone formation.

Figure 8:
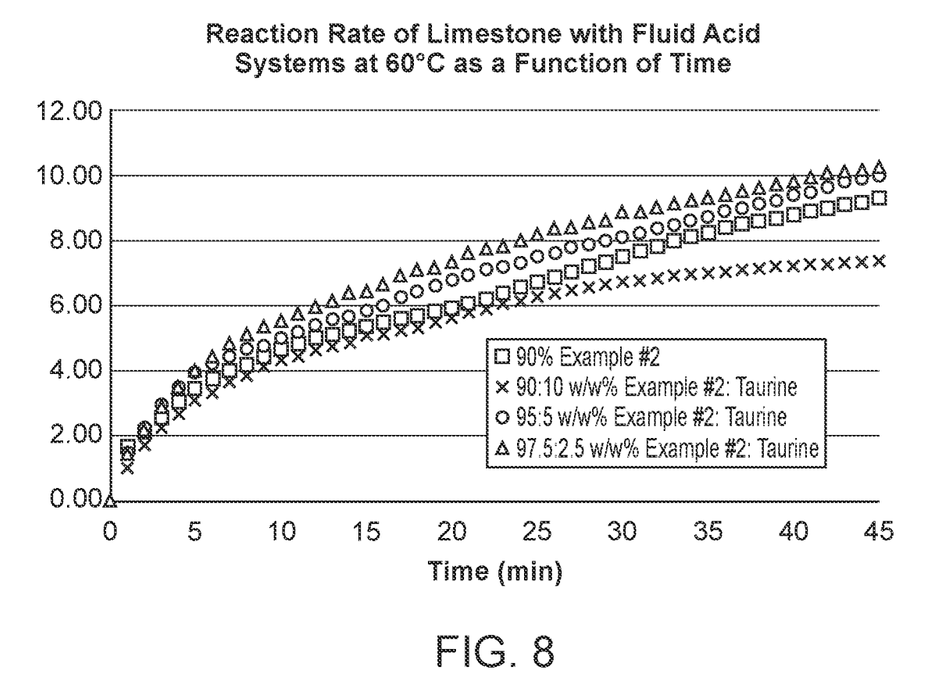
FIG. 8 is a graphical representation of the long-term solubility of limestone in various Lysine-HCl-Taurine hybrid acid systems at 60° C.

FIG. 8 shows the dissolution of limestone over time for 4 different compositions over a longer period of time than the one shown in FIG. 7. The first being the composition of Example #2, the second being a blend of the composition of Example #2 and (90% content) and 10% of taurine, the third being a blend of the composition of Example #2 (95% content) and 5% of taurine, and the fourth being a blend of the composition of Example #2 (97.5% content) and 2.5% of taurine. The best performance was noted to come from the 10% taurine-containing composition.

Determining the Reaction Rates of a HCl-Taurine Composition

The purpose was to determine the solubility of dolomite by a HCl-taurine composition. The procedure consisted of preparing blends of HCl (15%) with taurine at three different ratios; 90:10, 95:5, 97.5:2.5 and contrasted with a 15% HCl composition. On a two-decimal balance, a uniformed piece of either dolomite was added to the solution. As the solid solubilized, the weight loss was recorded at one-minute intervals for a total of 30 minutes.

Figure 9:
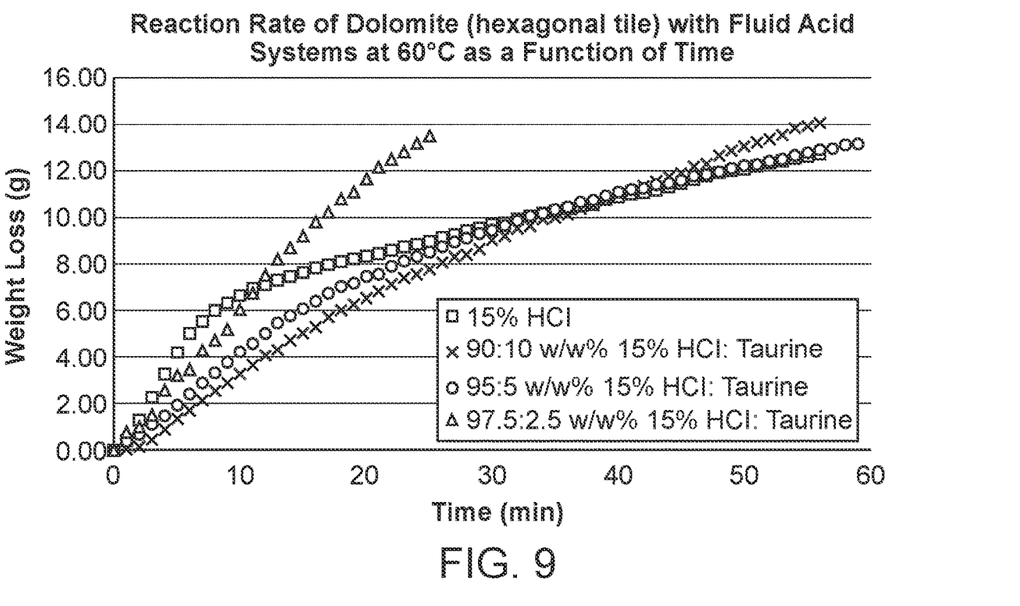
FIG. 9 is a graphical representation of the long-term solubility of dolomite in various 15% HCl-Taurine hybrid acid systems at 60° C.

FIG. 9 shows the dissolution of dolomite (hexagonal tile) over time for 4 different compositions. The first being the composition of 15% HCl, the second being a blend of the composition of 15% HCl (90% content) and 10% of taurine, the third being a blend of the composition of 15% HCl (95% content) and 5% of taurine, and the fourth being a blend of the composition of 15% HCl (97.5% content) and 2.5% of taurine. As expected, the 15% HCl composition dissolved the dolomite more quickly than all of the taurine-containing compositions. The best performance was noted to be the 2.5% and 5% taurine-containing compositions. This is a clear indication that the presence of taurine in an acidic composition has a quantifiable and desirable effect in making wormholes for good extraction of hydrocarbons trapped in a dolomite formation.

Determining the Reaction Rates of a Blend of Arginine:HCl-Taurine

The purpose was to determine the solubility of dolomite and limestone in a hybrid modified acid blend comprising Arginine-HCl and Taurine. The procedure consisted of preparing blends of Arginine-HCl (in a 1:5.125 molar ratio) with taurine at three different ratios; 90:10, 95:5, 97.5:2.5 and contrasted with a 90% solution of the composition of Arginine-HCl. On a two-decimal balance, a uniformed piece of either dolomite or limestone was added to the solution. As the solid solubilized, the weight loss was recorded at one-minute intervals for a total of 30 minutes.

Figure 10:
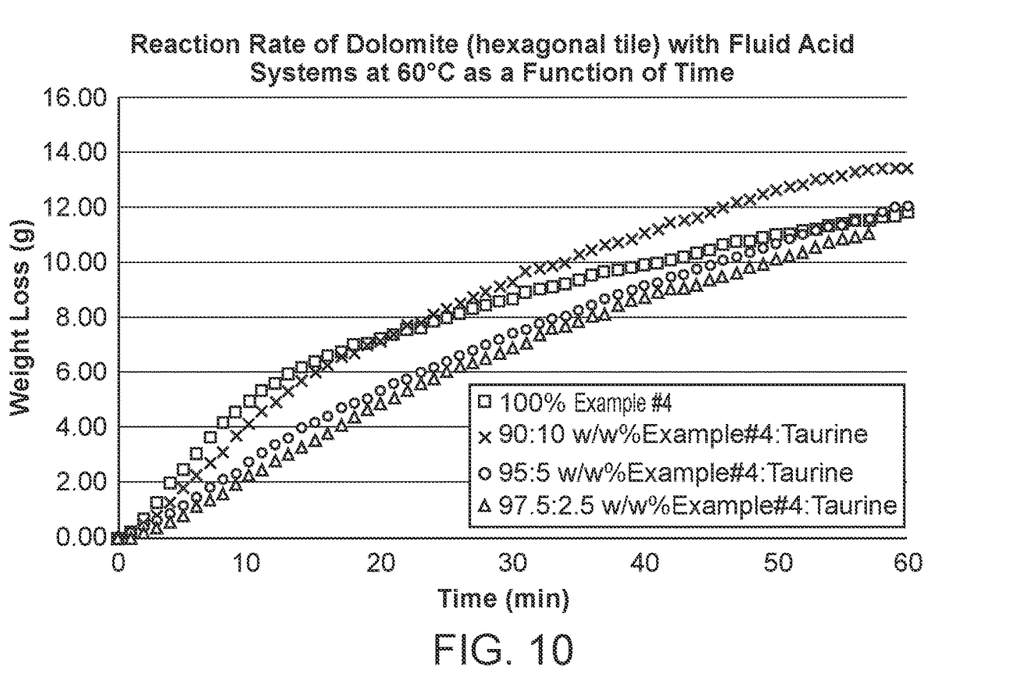
FIG. 10 is a graphical representation of the long-term solubility of dolomite in various Arginine-HCl-Taurine hybrid acid systems at 60° C.

FIG. 10 shows the dissolution of dolomite (hexagonal tile) over time for 4 different compositions. The first being the composition of 15% HCl-Arginine (at a dilution of 90%), the second being a blend of the composition of 15% HCl-Arginine (at a dilution of 90%) for a 90% content and 10% of taurine, the third being a blend of the composition of HCl-Arginine (at a dilution of 90%) for a 95% content and 5% of taurine, and the fourth being a blend of the composition of HCl-Arginine (at a dilution of 90%) for a 97.5% content and 2.5% of taurine. As expected, the composition devoid of taurine dissolved the dolomite more quickly than all of the taurine-containing compositions. The best performance was noted to be the 2.5% and 5% taurine-containing compositions. This is a clear indication that the presence of taurine in an acidic composition has a quantifiable and desirable effect in making wormholes for good extraction of hydrocarbons trapped in a dolomite formation.

Figure 11:
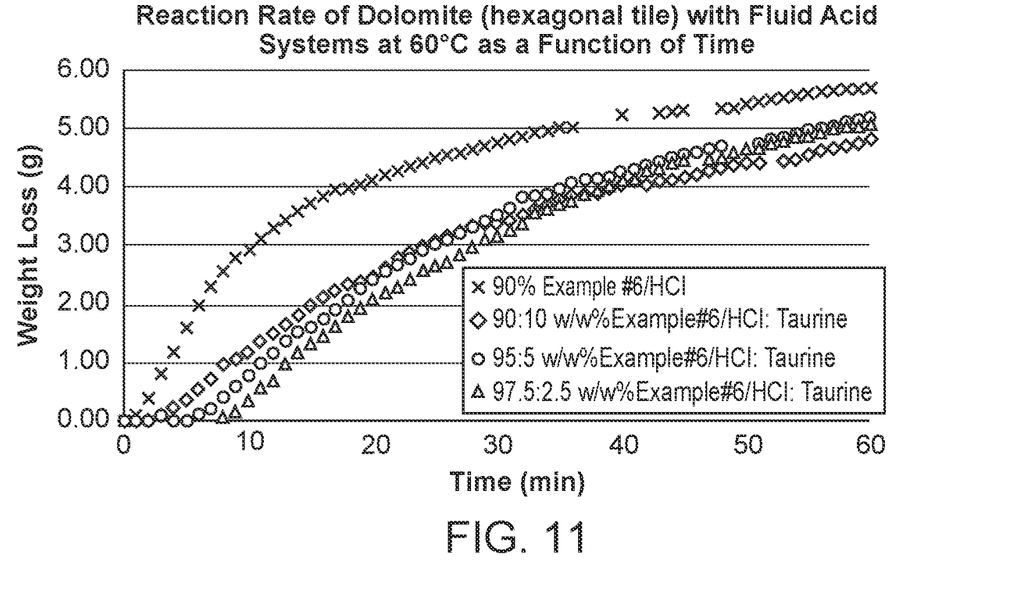
FIG. 11 is a graphical representation of the long-term solubility of limestone in various Arginine-HCl-Taurine hybrid acid systems at 60° C.

FIG. 11 shows the dissolution of limestone over time for 4 different compositions. The first being the composition of 15% HCl-Arginine (at a dilution of 90%), the second being a blend of the composition of 15% HCl-Arginine (at a dilution of 90%) for a 90% content and 10% of taurine, the third being a blend of the composition of HCl-Arginine (at a dilution of 90%) for a 95% content and 5% of taurine, and the fourth being a blend of the composition of HCl-Arginine (at a dilution of 90%) for a 97.5% content and 2.5% of taurine. The best performance was noted to be the 10% taurine-containing composition. This is a clear indication that the presence of taurine in an acidic composition has a quantifiable and desirable effect in making wormholes for good extraction of hydrocarbons trapped in a limestone formation.

Determining the Reaction Rates of a Blend of Histidine-HCl-Taurine

The purpose was to determine the solubility of dolomite in a hybrid modified acid blend comprising Histidine-HCl and Taurine. The procedure consisted of preparing blends of Histidine-HCl (in a 1:5.125 molar ratio) with taurine at three different ratios; 90:10, 95:5, 97.5:2.5 and contrasted with a 90% solution of the composition of Histidine-HCl. On a two-decimal balance, a uniformed piece of either dolomite was added to the solution. As the solid solubilized, the weight loss was recorded at one-minute intervals for a total of 30 minutes.

Figure 12:
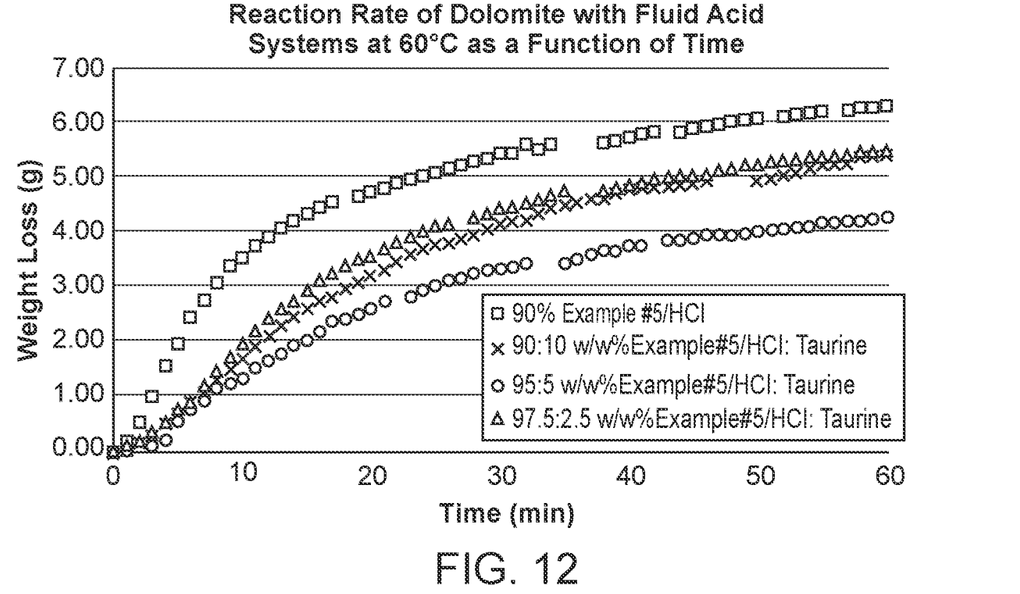
FIG. 12 is a graphical representation of the long-term solubility of dolomite in various Histidine-HCl-Taurine hybrid acid systems at 60° C.

FIG. 12 shows the dissolution of dolomite over time for 4 different compositions. The first being the composition of 15% Histidine-HCl (at a dilution of 90%), the second being a blend of the composition of 15% Histidine-HCl (at a dilution of 90%) for a 90% content and 10% of taurine, the third being a blend of the composition of Histidine-HCl (at a dilution of 90%) for a 95% content and 5% of taurine, and the fourth being a blend of the composition of Histidine-HCl (at a dilution of 90%) for a 97.5% content and 2.5% of taurine. This is a clear indication that the presence of taurine in an acidic composition has a quantifiable and desirable effect in making wormholes for good extraction of hydrocarbons trapped in a dolomite formation.

Testing for the Total Solubility of $CaCO_3$ in Example #2-Taurine Blends

The purpose was to determine the total solubility of $CaCO_3$ in different compositions comprising the acidic composition of Example #2 and taurine. To test the total solubility of calcium carbonate in Example #2: Taurine hybrid blends, three different ratios were prepared; (90:10, 95:5, 97.5:2.5) and were contrasted with 90% Example #2.

The procedure consisted of taking 50 mL of each blend and adding it to ~30 g of calcium carbonate. The solutions were left to completely solubilize (overnight), after which the fluid was filtered and the remaining material was washed, dried, and weighed. The total solubility was determined from the weight loss.

TABLE 1

Total solubility of calcium carbonate in Example #2-Taurine hybrid blends at 20° C.

| Fluid | Total Solubility of $CaCO_3$ (kg/m$^3$) Trial #1 | Total Solubility of $CaCO_3$ (kg/m$^3$) Trial #2 | Total Solubility of $CaCO_3$ (kg/m$^3$) Trial #3 | Average |
|---|---|---|---|---|
| 90% Example #2 | 214.686 | 205.414 | 177.474 | 199.1913 |
| 90% Example #2:10 wt % Taurine | 182.940 | 173.614 | 162.762 | 173.1053 |
| 95% Example #2:5 wt % | 160.324 | 193.028 | 195.740 | 183.0307 |

TABLE 1-continued

Total solubility of calcium carbonate in Example #2-Taurine hybrid blends at 20° C.

| Fluid | Total Solubility of CaCO$_3$ (kg/m$^3$) Trial #1 | Total Solubility of CaCO$_3$ (kg/m$^3$) Trial #2 | Total Solubility of CaCO$_3$ (kg/m$^3$) Trial #3 | Average |
|---|---|---|---|---|
| Taurine 97.5% Example #2:2.5 wt % Taurine | 191.260 | 193.230 | 180.460 | 188.3167 |

The above tests show that the presence of taurine does have an impact on the solubility of calcium carbonate despite not showing a clear correlation between % content and overall CaCO$_3$ solubility.

One of the observations made is that the compositions according to the present invention react specifically faster with dolomite than with limestone. The solubility shows us that also the total solubility of the modified (taurine) acids is higher with dolomite.

Total Solubility Testing
Procedure:

To determine the total solubility of the fluids listed above, 20-30 grams of the selected solute was added to the solution of acid over a 24 hour period at ambient temperature. The fluids were then filtered through P8 filter paper and the remaining residue was washed, dried, and weighed. The total solubility was determined from the weight loss. The results are summarized in Table 2.

TABLE 2

Total Solubility tests for the different modified acid blends with various solutes

| Blend | Solute Used | Total solubility (kg/m$^3$) |
|---|---|---|
| 90% Example 6 | CaCO$_3$ | 95.806 |
| 95:5% Example 6: Taurine | CaCO$_3$ | 84.252 |
| 97.5%:2.5% Example 6: Taurine | CaCO$_3$ | 88.262 |
| 90% Example 5 | CaCO$_3$ | 123.066 |
| 95%:5% Example 5: Taurine | CaCO$_3$ | 132.390 |
| 97.5%:2.5% Example 5: Taurine | CaCO$_3$ | 134.220 |
| 90% Example 6 | CaMg(CO$_3$)$_2$ | 134.372 |
| 95%:5% Example 6: Taurine | CaMg(CO$_3$)$_2$ | 125.568 |
| 97.5%:2.5% Example 6: Taurine | CaMg(CO$_3$)$_2$ | 133.890 |
| 90% Example 5 | CaMg(CO$_3$)$_2$ | 96.878 |
| 95:5 Example 5: Taurine | CaMg(CO$_3$)$_2$ | 148.590 |
| 97.5:2.5 Example 5: Taurine | CaMg(CO$_3$)$_2$ | 133.372 |
| 90% Example 2 | CaMg(CO$_3$)$_2$ | 140.482 |
| 95%:5% Example 2: Taurine | CaMg(CO$_3$)$_2$ | 129.140 |
| 97.5%:2.5% Example 2: Taurine | CaMg(CO$_3$)$_2$ | 161.096 |

Corrosion Rate Testing
Procedure:

Corrosion tests were executed in a high pressure/high temperature Teflon lined cell. Each coupon was washed with acetone, air dried, and weighed, before being suspended in the test fluid and then the cell was pressurized with nitrogen. Each cell was placed in a preheated oven for the specified test duration, plus an additional 30 minutes of heat up time for tests less than 24 hours in duration. After the exposure period, each cell was depressurized, and the coupon was removed, washed with water, followed by an acetone wash, air dried, and then weighed.

The corrosion rate was determined from the weight loss, and a pitting index was evaluated visually at 40× magnification, and a photo of the coupon surface at 40× magnification was taken.

TABLE 3

Corrosion testing results for various metal coupons using various compositions for a duration of 6 hours at a pressure of 400 psi and a temperature of 110° C.

| | Test Fluid | Corrosion result Mm/year | Lb/ft$^2$ | Pitting index |
|---|---|---|---|---|
| C431 | 7.5% HCl | 273.499 | 0.301 | 4 |
| C300 | 50% (95%:5% 15% HCl:Taurine) | 233.433 | 0.257 | 4 |
| C302 | 50% (97.5:2.5 15% HCl:Taurine) | 230.325 | 0.253 | 4 |
| C428 | 50% Example 2 | 119.567 | 0.131 | 4 |
| C405 | 50% (95%:5% Example 2: Taurine) | 119.278 | 0.131 | 4 |
| C406 | 50% (97.5%:2.5% Example 5: Taurine) | 114.395 | 0.126 | 4 |
| C429 | 50% Example 6 | 215.984 | 0.237 | 4 |
| C425 | 50% (95%:5% Example 6: Taurine) | 128.815 | 0.142 | 4 |
| C426 | 50% (97.5%:2.5% Example 6: Taurine) | 179.801 | 0.198 | 4 |
| C430 | 50% Example 5 | 220.004 | 0.242 | 4 |
| C427 | 50% (95%:5% Example 5: Taurine) | 186.755 | 0.205 | 4 |
| C432 | 50% (97.5%:2.5% Example 5: Taurine) | 171.497 | 0.188 | 4 |

Pitting index scale (0-9) score: 4 indicates more than 25 pits of pitting index 3 on either surface. Pitting scale score #3 refers to scattered, very shallow pinpoint pits, less than 25 pits on either surface (front or back)

According to a preferred embodiment, the compositions of the present invention exhibits stability for operations at elevated temperature (above 90° C. and, in some cases, up to 220° C.) and therefore makes them useful in the oil and gas industry for all applications (beyond simply acidizing dolomite formations) where an acid is required and provides operators the ability to treat high and ultra-high temperature completions and maintenance/production operations with a technology that provides a level of safety, technical advantages and low corrosion unavailable in industry until now. Preferred compositions according to the present invention can ideally be used in various oilfield operations, including but not limited to: spearhead breakdown acid, acid fracturing operations, injection-disposal well treatments, high temperature cyclical steam injection (CSS) scale treatments, steam assisted gravity drainage (SAGD) scale treatments, surface and subsurface equipment and pipelines facilities, filter cake removal, tubing pickling, matrix acidizing operations, stimulations, fracturing, soaks, cement squeezes, fluid pH control, stuck pipe operations, and coiled tubing acid washes, soaks and squeezes.

According to a preferred embodiment of the present invention, there is provided an aqueous modified acid composition which, upon proper use, results in a very low corrosion rate on oil and gas industry tubulars and equipment.

According to a preferred embodiment of the present invention, there is provided an aqueous modified acid composition for use in the oil industry which is biodegradable.

According to another preferred embodiment of the present invention, there is provided an aqueous modified acid composition for use in the oil industry which has a controlled, more methodical spending (reacting) nature that is near linear as temperature increases, low-fuming, low-toxicity, and has a highly controlled manufacturing process ensuring consistent end product strength and quality.

According to another preferred embodiment of the present invention, there is provided an aqueous modified acid composition for use in the oil industry which has a pH below 1.

According to another preferred embodiment of the present invention, there is provided an aqueous modified acid composition for use in the oil industry which will keep iron particles and solubilized carbonate in solution even as the pH rises to a level>4 pH.

According to another preferred embodiment of the present invention, there is provided an aqueous modified acid composition for use in the oil industry which will provide a thermal stability at temperatures above 100° C.

According to another preferred embodiment of the present invention, there is provided a modified acid composition for use in the oil industry which will provide corrosion protection at an acceptable oilfield limit when said composition is in contact with metal components and is at temperatures ranging from 100° C. to 220° C.

According to a preferred embodiment of the present invention, there is provided a modified acid composition for use in the oil industry which has minimal exothermic reactivity upon dilution or during the reaction process. Preferably, the aqueous modified acid composition for use in the oil industry is compatible with existing industry acid additives.

According to another preferred embodiment of the present invention, there is provided an aqueous modified acid composition for use in the oil industry which has higher salinity tolerance. A tolerance for high salinity fluids, or brines, is desirable for onshore and offshore acid applications. Conventional acids are normally blended with fresh water and additives, typically far offsite, and then transported to the area of treatment as a finished blend. It is advantageous to have an alternative that can be transported as a concentrate safely to the treatment area, then blended with a saline produced water or sea water greatly reducing the logistics requirement. A conventional acid system can precipitate salts/minerals heavily if blended with fluids of an excessive saline level resulting in formation plugging or ancillary damage, inhibiting production and substantially increasing costs. Brines are also typically present in formations, thus having an acid system that has a high tolerance for brines greatly reduces the potential for formation damage or emulsions forming down-hole during or after product placement/spending (reaction) occurs.

According to another aspect of the present invention, there is provided an aqueous modified acid composition for use in the oil industry which is immediately reactive upon contact/application.

According to another aspect of the present invention, there is provided an aqueous modified acid composition for use in the oil industry which results in less unintended near wellbore erosion or face dissolution due to a more controlled reaction rate. This, in turn, results in deeper formation penetration, increased permeability, and reduces the potential for zonal communication during a typical 'open hole' mechanical isolation application treatment. As a highly reactive acid, such as hydrochloric acid, is deployed into a well that has open hole packers for isolation (without casing) there is a potential to cause a loss of near-wellbore compressive strength resulting in communication between zones or sections of interest as well as potential sand production, and fines migration. It is advantageous to have an alternative that will react with a much more controlled rate or speed, thus greatly reducing the potential for zonal communication and the above potential negative side effects of traditional acid systems.

According to a preferred embodiment of the present invention, there is provided an aqueous modified acid composition for use in the oil industry which provides a controlled and comprehensive reaction rate throughout a broad range of temperatures up to 220° C.

According to another preferred embodiment of the present invention, there is provided a use of an aqueous modified acid composition comprising lysine and hydrogen chloride in a molar ratio ranging from 1:3.0 to 1:12.5 for injection into an oil or gas well to perform a treatment with said composition; recovering the spent acid from the well; and sending the spent acid to a plant. Preferably, the ratio is 1:3.5 to 1:12.5. According to another preferred embodiment of the present invention, the molar ratio for arginine-HCl can range from 1:3.5 to 1:15, but is preferably used in a molar ratio of approximately 1:5.215. According to another preferred embodiment of the present invention, the molar ratio for histidine-HCl can range from 1:3.5 to 1:15, but is preferably used in a molar ratio of approximately 1:5.215.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. An aqueous modified acid composition comprising:
   an acid;
   a first component comprising an amino acid having a single carboxylic acid group, the amino acid selected from the group consisting of lysine, glycine, alanine, methionine, histidine, arginine, serine, proline, cysteine, threonine, and selenocysteine;
   a second component having a structure comprising an amine group and a sulfonic acid group;
   wherein said first component and said acid are present in a molar ratio ranging from 1:3 to 1:12.5, and
   wherein the aqueous modified acid composition acidizes or stimulates hydrocarbon-containing dolomite formations and hydrocarbon-containing limestone formations to create wormholes therein.

2. The aqueous modified acid composition according to claim 1 wherein the acid is selected from the group consisting of: HCl; and amino acid:HCl blends.

3. The aqueous modified acid composition according to claim 1 wherein the second component is selected from the group consisting of: taurine; taurocholic acid; tauroselcholic acid; 5-Taurinomethyluridine; 5-taurinomethyl-2-thiouridine; homotaurine (tramiprosate); and acamprosate.

4. The aqueous modified acid composition according to claim 1 wherein the second component is taurine.

5. The aqueous modified acid composition according to claim 1, wherein the composition is stable at temperatures of up to at least 80° C.

6. The aqueous modified acid composition according to claim 1, wherein the composition is stable at temperatures of up to at least 120° C.

7. The aqueous modified acid composition according to claim 1, wherein the composition is stable at temperatures of up to at least 150° C.

8. The aqueous modified acid composition according to claim 1, wherein the composition has a pH of no more than 1.5.

9. The aqueous modified acid composition according to claim 1, wherein the acid is present in an amount ranging from 5 to 40 wt % of the aqueous modified acid composition.

10. The aqueous modified acid composition according to claim 1, wherein the acid is present in an amount ranging from 10 to 30 wt % of the aqueous modified acid composition.

11. The aqueous modified acid composition according to claim 1, wherein the second component is present in an amount ranging from 1 to 20 wt % of the aqueous modified acid composition.

12. The aqueous modified acid composition according to claim 1, wherein the second component comprising is present in an amount ranging from 2 to 15 wt % of the aqueous modified acid composition.

13. The aqueous modified acid composition according to claim 1, wherein the second component is present in an amount ranging from 5 to 10 wt % of the aqueous modified acid composition.

14. The aqueous modified acid composition according to claim 1, wherein the aqueous modified acid composition is provided in a geological formation for the dissolution of dolomite therefrom.

15. A method to selectively dissolve dolomite over calcium carbonate rock, said method comprising:
providing a composition according to claim 1;
injecting said composition downhole into a rock formation containing dolomite; and
contacting the rock formation containing dolomite with said composition for a period of time sufficient to dissolve dolomite and create wormholes in the rock formation.

16. A method of acidizing or stimulating a hydrocarbon-containing dolomite formation, said method comprising:
providing a composition according to claim 1;
injecting said composition downhole into said dolomite formation at a pressure below a fracking pressure of the formation; and
contacting said dolomite formation with said composition for a period of time sufficient to create wormholes in said dolomite formation.

17. A method of acidizing or stimulating a hydrocarbon-containing limestone formation, said method comprising:
providing a composition according to claim 1;
injecting said composition downhole into said limestone formation at a pressure below a fracking gradient level of the limestone formation; and
contacting said limestone formation with said composition for a period of time sufficient to create wormholes in said limestone formation.

18. A method of creating wormholes in a hydrocarbon-containing formation, said method comprising:
providing a composition according to claim 1;
injecting said composition downhole at a desired injection rate into said formation at a pressure below the fracture gradient level of the formation; and
contacting said formation with said composition for a period of time sufficient to create wormholes in said formation.

19. The aqueous modified acid composition according to claim 1, wherein the second component is taurine.

20. An aqueous modified acid composition comprising:
an acid;
a first component comprising an amino acid having a single carboxylic acid group, the amino acid selected from the group consisting of lysine, glycine, alanine, methionine, histidine, arginine, serine, proline, cysteine, threonine, and selenocysteine;
a second component comprising taurolidine or tauromustine;
wherein said first component and said acid are present in a molar ratio ranging from 1:3 to 1:12.5, and
wherein the aqueous modified acid composition acidizes or stimulates hydrocarbon-containing dolomite formations and hydrocarbon-containing limestone formations to create wormholes therein.

* * * * *